United States Patent
Botman et al.

(10) Patent No.: US 10,642,710 B2
(45) Date of Patent: May 5, 2020

(54) APPARATUS AND METHOD FOR GENERATING AND PROCESSING A TRACE STREAM INDICATIVE OF EXECUTION OF PREDICATED VECTOR MEMORY ACCESS INSTRUCTIONS BY PROCESSING CIRCUITRY

(71) Applicant: ARM Limited, Cambridge (GB)

(72) Inventors: François Christopher Jacques Botman, Cambridge (GB); Thomas Christopher Grocutt, Cambridge (GB); John Michael Horley, Hauxton (GB)

(73) Assignee: ARM Limited, Cambridge (GB)

( * ) Notice: Subject to any disclaimer, the term of this patent is extended or adjusted under 35 U.S.C. 154(b) by 177 days.

(21) Appl. No.: 15/838,615

(22) Filed: Dec. 12, 2017

(65) Prior Publication Data
US 2018/0210805 A1 Jul. 26, 2018

(30) Foreign Application Priority Data
Jan. 24, 2017 (GB) .................................. 1701183.4

(51) Int. Cl.
*G06F 11/34* (2006.01)
*G06F 7/548* (2006.01)
(Continued)

(52) U.S. Cl.
CPC .......... *G06F 11/3466* (2013.01); *G06F 7/548* (2013.01); *G06F 9/3001* (2013.01);
(Continued)

(58) Field of Classification Search
CPC combination set(s) only.
See application file for complete search history.

(56) References Cited

U.S. PATENT DOCUMENTS 5,113,521 A * 5/1992 McKeen ................. G06F 9/462
714/15
6,536,037 B1 * 3/2003 Guheen ..................... G06F 8/71
703/2

(Continued)

OTHER PUBLICATIONS

Combined Search and Examination Report for GB1701183.4 dated Jul. 20, 2017, 5 pages.

*Primary Examiner* — Amine Riad
(74) *Attorney, Agent, or Firm* — Nixon & Vanderhye P.C.

(57) ABSTRACT

An apparatus and method are provided for generating and processing a trace stream indicative of execution of predicated vector memory access instructions by processing circuitry. An apparatus has an input interface to receive execution information from the processing circuitry indicative of operations performed by that processing circuitry when executing a sequence of instructions. The sequence includes at least one predicated vector memory access instruction executed to perform a memory transfer operation in order to transfer data values of a vector between a vector register and addresses accessed in memory. The vector comprises a plurality of lanes, where the number of lanes is dependent on the size of the data values represented within the vector, and predicate information referenced when executing the predicated vector memory access instruction is used to determine which lanes are subjected to the memory transfer operation. The apparatus has trace generation circuitry to generate from the execution information a data trace stream comprising a plurality of trace elements. For each predicated vector memory access instruction executed, the trace generation circuitry is arranged to issue within the data trace stream a number of address trace elements, each address trace element providing an address indication for an address accessed in memory, and each address trace element being associated with a fixed sized data block irrespective of (Continued)

the size of the data values accessed when executing the memory access instruction. The trace generation circuitry further issues within the data trace stream, for each predicated vector memory access instruction executed, at least one predicate trace element to identify any lanes of the vector that have been omitted from the memory transfer operation. It has been found that such an approach provides a particularly bandwidth efficient mechanism for tracing predicated vector memory access instructions.

22 Claims, 10 Drawing Sheets

(51) Int. Cl.
*G06F 9/30* (2018.01)
*G06F 11/14* (2006.01)

(52) U.S. Cl.
CPC ...... *G06F 9/30018* (2013.01); *G06F 9/30036* (2013.01); *G06F 9/30043* (2013.01); *G06F 11/3471* (2013.01); *G06F 11/3476* (2013.01); *G06F 11/141* (2013.01)

(56) References Cited

U.S. PATENT DOCUMENTS

| | | | | |
|---|---|---|---|---|
| 7,043,668 B1* | 5/2006 | Treue | ............. | G06F 11/3636 712/227 |
| 7,168,066 B1* | 1/2007 | Thekkath | ............ | G06F 11/3636 717/127 |
| 2004/0193887 A1* | 9/2004 | Foster | ................ | H04L 63/0823 713/176 |
| 2007/0220362 A1* | 9/2007 | Williams | ................ | G06F 11/28 714/45 |
| 2007/0294592 A1* | 12/2007 | Ashfield | ............... | G06F 9/3804 714/45 |
| 2009/0089626 A1* | 4/2009 | Gotch | ................ | G06F 11/3476 714/45 |
| 2009/0183034 A1* | 7/2009 | Houlihane | .......... | G06F 11/3632 714/45 |
| 2011/0314340 A1* | 12/2011 | Gilkerson | ............ | G06F 9/3808 714/37 |
| 2013/0311530 A1* | 11/2013 | Lee | ......................... | G06F 7/548 708/441 |
| 2014/0059328 A1* | 2/2014 | Gonion | ............... | G06F 9/30036 712/222 |
| 2015/0089190 A1* | 3/2015 | Gonion | ............... | G06F 9/30036 712/7 |
| 2015/0242210 A1* | 8/2015 | Kim | ..................... | G06F 9/30189 712/7 |
| 2015/0261590 A1* | 9/2015 | Sperber | ............... | G06F 11/0721 714/42 |
| 2015/0317338 A1* | 11/2015 | Radovic | ............ | G06F 9/30043 707/695 |
| 2016/0179632 A1* | 6/2016 | Matas | ................... | G06F 11/141 714/6.11 |
| 2016/0371501 A1* | 12/2016 | Horley | .................... | G06F 21/74 |
| 2017/0083321 A1* | 3/2017 | Burger | .................... | G06F 9/268 |
| 2017/0083327 A1* | 3/2017 | Burger | ................. | G06F 9/3004 |
| 2018/0004519 A1* | 1/2018 | Brown | ................ | G06F 9/30036 |
| 2018/0210805 A1* | 7/2018 | Botman | ............ | G06F 11/3466 |
| 2018/0260335 A1* | 9/2018 | Horley | ................ | G06F 12/1009 |
| 2019/0087298 A1* | 3/2019 | Kona | ................. | G06F 11/3466 |

\* cited by examiner (a) Predicate Format 1 packet (b) Predicate Format 2 packet (c) Predicate Format 3 packet (d) Predicate Format 4 packet

APPARATUS AND METHOD FOR GENERATING AND PROCESSING A TRACE STREAM INDICATIVE OF EXECUTION OF PREDICATED VECTOR MEMORY ACCESS INSTRUCTIONS BY PROCESSING CIRCUITRY This application claims priority to GB Application No. 1701183.4 filed Jan. 24, 2017, the entire contents of which are hereby incorporated by reference.

BACKGROUND

The present technique relates to mechanisms for generating and processing a trace stream indicative of activities of processing circuitry within a data processing system, and in particular to mechanisms for efficiently generating a data trace stream in situations where the sequence of instructions executed by the processing circuitry includes at least one predicated vector memory access instruction.

Trace circuitry can be used to produce one or more trace streams comprising a series of trace elements, such that those trace elements can later be analysed in order to determine activities of associated processing circuitry. For example, an instruction trace stream can be generated that includes a number of trace elements enabling analysis circuitry to later determine the sequence of instructions executed by the processing circuitry. Further, if desired, a data trace stream can be produced that also comprises a plurality of trace elements to enable analysis circuitry to later determine information about memory addresses (and optionally data values) accessed when the processing circuitry executed memory access instructions within the sequence of instructions.

Some data processing systems support processing of vector instructions, and within such vector processing systems, vector memory access instructions can be executed to perform a memory transfer operation in order to transfer data values of a vector between a vector register and addresses accessed in memory. Further, in modern systems it is possible to apply predication to such instructions, so that certain lanes are omitted from the operation.

It would be desirable to provide an efficient tracing mechanism to be used by trace circuitry when producing a data trace stream in association with predicated vector memory access instructions.

SUMMARY

In one example configuration, there is provided an apparatus comprising: an input interface to receive execution information from processing circuitry indicative of operations performed by the processing circuitry when executing a sequence of instructions, said sequence including at least one predicated vector memory access instruction executed to perform a memory transfer operation in order to transfer data values of a vector between a vector register and addresses accessed in memory, the vector comprising a plurality of lanes, the number of lanes being dependent on a size of the data values represented within the vector, and predicate information referenced when executing the predicated vector memory access instruction being used to determine which lanes are subjected to the memory transfer operation; and trace generation circuitry to generate from the execution information a data trace stream comprising a plurality of trace elements, for each predicated vector memory access instruction executed the trace generation circuitry being arranged to issue within said data trace stream a number of address trace elements, each address trace element providing an address indication for an address accessed in memory, and each address trace element being associated with a fixed sized data block irrespective of the size of the data values accessed when executing that predicated vector memory access instruction; the trace generation circuitry further being arranged to issue within the data trace stream, for each predicated vector memory access instruction executed, at least one predicate trace element to identify any lanes of the vector that have been omitted from the memory transfer operation.

In another example configuration, there is provided an apparatus comprising: an input interface to receive trace information indicative of operations performed by processing circuitry when executing a sequence of instructions, said sequence including at least one predicated vector memory access instruction executed to perform a memory transfer operation in order to transfer data values of a vector between a vector register and addresses accessed in memory, the vector comprising a plurality of lanes, the number of lanes being dependent on a size of the data values represented within the vector, and predicate information referenced when executing the predicated vector memory access instruction being used to determine which lanes are subjected to the memory transfer operation; the trace information comprising a data trace stream comprising a plurality of trace elements, for each predicated vector memory access instruction executed the data trace stream comprising a number of address trace elements, each address trace element providing an address indication for an address accessed in memory, and each address trace element being associated with a fixed sized data block irrespective of the size of the data values accessed when executing that predicated vector memory access instruction, the data trace stream also including, for each predicated vector memory access instruction executed, at least one predicate trace element to identify any lanes of the vector that have been omitted from the memory transfer operation; the apparatus further comprising: decompression circuitry to detect from the trace information, with reference to a program image, execution of a predicated vector memory access instruction within said sequence of instructions, and to reference the corresponding at least one predicate trace element within the data trace stream to determine which lanes were subjected to the memory transfer operation performed on executing that predicated vector memory access instruction.

In a yet further example configuration, there is provided a method of operating trace generation circuitry to generate a trace stream comprising: receiving execution information from processing circuitry indicative of operations performed by the processing circuitry when executing a sequence of instructions, said sequence including at least one predicated vector memory access instruction executed to perform a memory transfer operation in order to transfer data values of a vector between a vector register and addresses accessed in memory, the vector comprising a plurality of lanes, the number of lanes being dependent on a size of the data values represented within the vector, and predicate information referenced when executing the predicated vector memory access instruction being used to determine which lanes are subjected to the memory transfer operation; generating from the execution information a data trace stream comprising a plurality of trace elements, including: issuing within said data trace stream, for each predicated vector memory access instruction executed, a number of address trace elements, each address trace element providing an address indication for an address accessed in memory, and each address trace element being associated with a fixed sized data block irrespective of the size of the data values accessed when executing that predicated vector memory access instruction; and issuing within the data trace stream, for each predicated vector memory access instruction executed, at least one predicate trace element to identify any lanes of the vector that have been omitted from the memory transfer operation.

In a further example configuration, there is provided an apparatus comprising: input interface means for receiving execution information from processing circuitry indicative of operations performed by the processing circuitry when executing a sequence of instructions, said sequence including at least one predicated vector memory access instruction executed to perform a memory transfer operation in order to transfer data values of a vector between a vector register and addresses accessed in memory, the vector comprising a plurality of lanes, the number of lanes being dependent on a size of the data values represented within the vector, and predicate information referenced when executing the predicated vector memory access instruction being used to determine which lanes are subjected to the memory transfer operation; and trace generation means for generating from the execution information a data trace stream comprising a plurality of trace elements, for each predicated vector memory access instruction executed the trace generation means for issuing within said data trace stream a number of address trace elements, each address trace element providing an address indication for an address accessed in memory, and each address trace element being associated with a fixed sized data block irrespective of the size of the data values accessed when executing that predicated vector memory access instruction; the trace generation means further for issuing within the data trace stream, for each predicated vector memory access instruction executed, at least one predicate trace element to identify any lanes of the vector that have been omitted from the memory transfer operation.

In a still further example configuration, there is provided a method of operating analysis circuitry to process a trace stream, comprising: receiving trace information indicative of operations performed by processing circuitry when executing a sequence of instructions, said sequence including at least one predicated vector memory access instruction executed to perform a memory transfer operation in order to transfer data values of a vector between a vector register and addresses accessed in memory, the vector comprising a plurality of lanes, the number of lanes being dependent on a size of the data values represented within the vector, and predicate information referenced when executing the predicated vector memory access instruction being used to determine which lanes are subjected to the memory transfer operation; detecting within the trace information a data trace stream comprising a plurality of trace elements, for each predicated vector memory access instruction executed the data trace stream comprising a number of address trace elements, each address trace element providing an address indication for an address accessed in memory, and each address trace element being associated with a fixed sized data block irrespective of the size of the data values accessed when executing that predicated vector memory access instruction, the data trace stream also including, for each predicated vector memory access instruction executed, at least one predicate trace element to identify any lanes of the vector that have been omitted from the memory transfer operation; and detecting from the trace information, with reference to a program image, execution of a predicated vector memory access instruction within said sequence of instructions, and referencing the corresponding at least one predicate trace element within the data trace stream to determine which lanes were subjected to the memory transfer operation performed on executing that predicated vector memory access instruction.

In a yet further example configuration, there is provided an apparatus comprising: input interface means for receiving trace information indicative of operations performed by processing circuitry when executing a sequence of instructions, said sequence including at least one predicated vector memory access instruction executed to perform a memory transfer operation in order to transfer data values of a vector between a vector register and addresses accessed in memory, the vector comprising a plurality of lanes, the number of lanes being dependent on a size of the data values represented within the vector, and predicate information referenced when executing the predicated vector memory access instruction being used to determine which lanes are subjected to the memory transfer operation; the trace information comprising a data trace stream comprising a plurality of trace elements, for each predicated vector memory access instruction executed the data trace stream comprising a number of address trace elements, each address trace element providing an address indication for an address accessed in memory, and each address trace element being associated with a fixed sized data block irrespective of the size of the data values accessed when executing that predicated vector memory access instruction, the data trace stream also including, for each predicated vector memory access instruction executed, at least one predicate trace element to identify any lanes of the vector that have been omitted from the memory transfer operation; the apparatus further comprising: decompression means for detecting from the trace information, with reference to a program image, execution of a predicated vector memory access instruction within said sequence of instructions, and for referencing the corresponding at least one predicate trace element within the data trace stream to determine which lanes were subjected to the memory transfer operation performed on executing that predicated vector memory access instruction.

BRIEF DESCRIPTION OF THE DRAWINGS

The present technique will be described further, by way of example only, with reference to embodiments thereof as illustrated in the accompanying drawings, in which.

DESCRIPTION OF EXAMPLES

Figure 1:
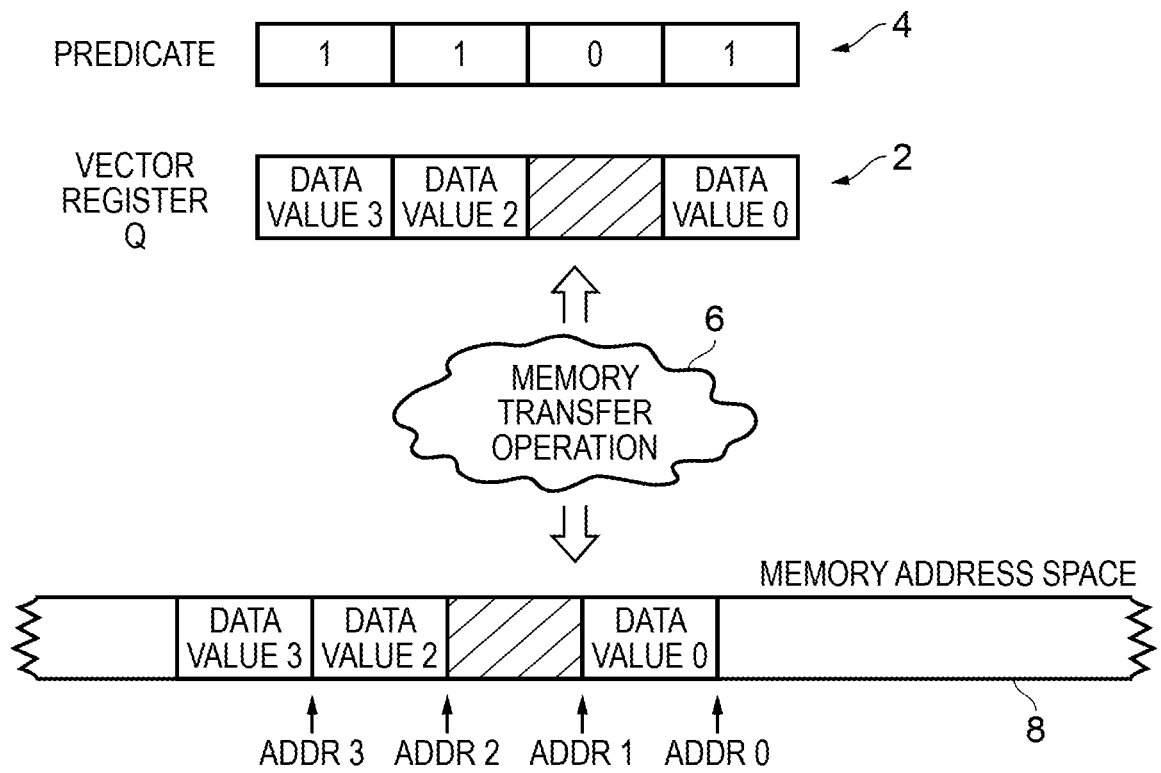
FIG. 1 is a diagram schematically illustrating a memory transfer operation performed on executing a predicated vector memory access instruction.

Before discussing the embodiments with reference to the accompanying figures, the following description of embodiments is provided.

Some data processing systems support processing of vector instructions for which a source operand or result value of the instruction is a vector comprising multiple elements. By supporting the processing of a number of distinct elements in response to a single instruction, code density can be improved and the overhead of fetching and decoding of instructions reduced. An array of data values to be processed can be processed more efficiently by loading the data values into respective elements of a vector operand and processing the data values several elements at a time using a single vector instruction.

Within such vector processing systems, vector memory access instructions can be executed to perform a memory transfer operation in order to transfer data values of a vector between a vector register and addresses accessed in memory. Hence, during execution of a single vector memory access instruction, multiple addresses may be accessed in memory, and a corresponding multiple number of data values may be accessed at those addresses.

In some modern vector processing systems, it is also possible to apply predication to certain instructions, including vector memory access instructions. As a result, it is possible that when a predicated vector memory access instruction is executed, one or more lanes of the vector may not be subjected to the memory transfer operation.

Tracing the activity of processing circuitry within a data processing system, whereby one or more streams of trace elements are generated which can then be analysed to identify the step-by-step activity of the processing circuitry is a highly useful tool in system software development. The trace stream(s) may for example be analysed in order to facilitate debugging of sequences of instructions being executed by the processing circuitry. Typically, the tracing mechanism is provided on-chip with the processing circuitry, an example of such an on-chip tracing mechanism being the Embedded Trace Macrocell (ETM) provided by ARM Limited, Cambridge, England in association with a variety of ARM processors. Such tracing mechanisms can potentially produce a large volume of trace elements that then need to be provided off-chip for further analysis, and accordingly it is important to seek to provide an efficient mechanism for tracing the various desired activities of the processing circuitry.

In some embodiments, it desired to analyse the memory access instructions executed by the processing circuitry, and hence a data trace stream may be produced which, for each memory access instruction executed, provides one or more address trace elements to identify the address or addresses accessed by the memory access instruction. If desired, in addition, the data values accessed can also be traced. As mentioned earlier, in vector processing systems, vector memory access instructions can be executed, where multiple addresses (and associated data values) are accessed when executing the vector memory access instruction. Further, it is possible to predicate the vector memory access instruction, so that certain addresses (and associated data values) are not subjected to the memory transfer operation defined by the vector memory access instruction. The aim of the embodiments described herein is to provide an efficient mechanism for tracing execution of such predicated memory access instructions.

In one embodiment, an apparatus is provided that comprises an input interface to receive execution information from processing circuitry indicative of operations performed by the processing circuitry when executing a sequence of instructions. That sequence includes at least one predicated vector memory access instruction executed to perform a memory transfer operation in order to transfer data values of a vector between a vector register and addresses accessed in memory. The vector comprises a plurality of lanes, the number of lanes being dependent on a size of the data values represented within the vector, and predicate information referenced when executing the predicated vector memory access instruction is used to determine which lanes are subjected to the memory transfer operation.

The apparatus further provides trace generation circuitry to generate from the execution information a data trace stream comprising a plurality of trace elements. For each predicated vector memory access instruction executed, the trace generation circuitry is arranged to issue within the data trace stream a number of address trace elements. Each address trace element provides an address indication for an address accessed in memory, and is associated with a fixed size data block irrespective of the size of the data values accessed when executing the predicated vector memory access instruction. In addition, the trace generation circuitry is arranged to issue within the data trace stream, for each predicated vector memory access instruction executed, at least one predicate trace element to identify any lanes of the vector that have been omitted from the memory transfer operation.

In accordance with the above described mechanism, an efficient technique is employed for generating the address trace elements, since the format of the address trace element is independent of the data value size being processed, and independent of whether the memory access instruction being executed is predicated or not. Instead, each address trace element is associated with a fixed size data block irrespective of the size of the data values accessed when executing the predicated vector memory access instruction, and the address trace elements themselves are not used to capture any predicate information. This avoids the requirement to provide different formats of trace element dependent on whether the instruction is predicated or not, and also avoids needing to provide different formats of address trace elements dependent on the size of the data values being processed. Instead, separately to the address trace elements, at least one predicate trace element is provided within the data trace stream to identify any lanes of the vector that have been omitted from the memory transfer operation. The form of the predicate trace element can vary dependent on embodiment. In the simplest case, it may only be necessary to issue a single predicate trace element in association with all of the address trace elements for a predicated vector memory access instruction. It has hence been found that the above use of address trace elements, each associated with a fixed size data block, in combination with at least one predicate trace element, provides a particularly efficient mechanism for tracing the execution behaviour of a predicated vector memory access instruction.

In one embodiment, the size of the data values processed by a predicated vector memory access instruction can vary between different vector memory access instructions. Typically a plurality of supported data value sizes may be provided, and for each predicated vector memory access instruction the memory transfer operation will be performed on data values whose size is selected from one of those supported data value sizes. As mentioned earlier, irrespective of the data value size, each address trace element is associated with a fixed size data block, and in one embodiment the fixed size data block is an integer multiple of each supported data value size. In one particular embodiment, the fixed size data block is 32 bits, and the plurality of supported data value sizes are 8 bits, 16 bits and 32 bits. By retaining the same format of address trace element irrespective of the data value size being processed, and by then capturing information about any lanes of the vector that have been omitted from the memory transfer operation (which by its nature will take into account data value size) in one or more separate predicate trace elements, this provides a particularly efficient use of trace bandwidth for tracing execution of predicated vector memory access instructions.

The format of each predicate trace element can be varied dependent on embodiment. However, in one embodiment, each predicate trace element has a format such that, when multiple predicate trace elements are issued within the data trace stream for one predicated vector memory access instruction, application of a logical combination operation to those multiple predicate trace elements identifies any lanes of the vector that have been omitted from the memory transfer operation. This hence provides a simple mechanism for constructing all of the required predicate information from multiple predicate trace elements. In one particular embodiment, the logical combination operation may simply be a logical OR operation.

The predicate trace element can take a variety of forms within the data trace stream, but in one embodiment the trace generation circuitry is arranged to issue each predicate trace element as a predicate trace packet, the predicate trace packet comprising a header portion identifying the trace packet as being a predicate trace packet, and a predicate specifying portion providing predicate data.

Whilst in one embodiment a single format of predicate trace packet may be provided, in an alternative embodiment the trace generation circuitry has access to a plurality of formats for the predicate trace packet, and the trace generation circuitry is arranged to apply format selection criteria to determine the format of each predicate trace packet to be issued in the data trace stream. By providing multiple formats, this can allow for further efficiencies in the use of the trace bandwidth. For example, in one embodiment the plurality of formats for the predicate trace packet comprises formats for different sizes of data values, and when applying the format selection criteria the trace generation circuitry is arranged to take into account the size of the data values transferred during execution of the predicated vector memory access instruction when determining which format of predicate trace packet to be issued. As a particular example, the size of the predicate trace packet may vary between the different formats, and when the data value size is larger, less predicate information may need to be captured, and accordingly a format of a smaller size may be chosen.

As mentioned earlier, in one embodiment, the data trace stream may be issued in addition to an instruction trace stream, the instruction trace stream containing sufficient information to enable a trace analysing circuit to determine which instructions have been executed by the processing circuitry. Various techniques may be used to link the instruction trace stream and the data trace stream together. In one particular embodiment, the trace generation circuitry is arranged to include within the instruction trace stream an instruction trace element for each predicated vector memory access instruction executed by the processing circuitry, said instruction trace element specifying an identifier key, and the trace generation circuitry is arranged to selectively specify the identifier key for one or more of the trace elements issued in the data trace stream in order to link said one or more trace elements with the corresponding instruction trace element in the instruction trace stream.

With regard to a predicate trace packet, the trace analyser may be able to infer which identifier key is associated with that predicate trace packet with reference to previously transmitted identifier key information within the data trace stream. However, in one embodiment the plurality of formats for the predicate trace packet include formats that incorporate an identifier key portion. In such embodiments, the trace generation unit may be arranged to select a format for the predicate trace packet that incorporates the identifier key portion when the identifier key pertaining to the predicate trace element cannot be inferred from preceding trace elements within the data trace stream. However, by providing at least one format that does not incorporate the identifier key portion, and using that format when the identifier key can be deduced from preceding trace elements, this further improves the efficient use of the trace bandwidth available when using the predicate trace packets.

In one embodiment, for each predicated vector memory access instruction executed the trace generation circuitry is arranged to issue within the data trace stream a plurality of address trace elements, each address trace element having a sequence number associated therewith. The number of address trace elements that needs to be issued can vary dependent on the number of separate accesses required to memory, and that can depend on a number of factors, such as the memory access bandwidth, the data value size being accessed, and whether the access relates to a contiguous sequence of addresses, or a non-contiguous sequence of addresses. By use of such sequence numbers, this can allow the trace analysing circuitry to readily order the various address trace elements received.

In one particular embodiment, when all data values to be associated with one of the address trace elements occupy lanes that are not subjected to the memory transfer operation, the trace generation circuitry may be arranged to suppress issuance of that address trace element and its associated sequence number within the data trace stream. Hence, further efficiency savings can be realised by omitting one or more address trace elements. In such situations when an address trace element is omitted, then if data value tracing is also enabled, the corresponding data value can also be omitted from the data trace stream.

In one embodiment, the identification of the lanes of the vector that have been omitted from the memory transfer operation, as determined from the at least one predicate trace element, includes identification of at least those lanes associated with the address trace element that has been suppressed. Hence, from analysis of the predicate information, the trace analysis circuitry will be able to verify that the omitted address trace element has indeed been omitted due to predication.

In one embodiment, when all of the lanes of the vector omitted from the memory transfer operation are associated with an address trace element that has been suppressed, the trace generation circuitry may be arranged to suppress generation of the at least one predicate trace element. Hence, in the particular situation where the omitted one or more address trace elements directly provides an indication of the lanes that have been omitted due to predication, then in one embodiment there is no need for a predicate trace element to be issued, hence providing further bandwidth efficiency savings.

As mentioned earlier, in one embodiment, the trace generation circuitry may be further arranged to issue within the data trace stream a data block trace element in association with each address trace element issued in the data trace stream, to identify the data block accessed at the address indicated by the associated address trace element. Where contiguous addresses are accessed, the data block may actually represent one or more data values, dependent on the data value size associated with the corresponding memory access instruction.

It is possible in practice that execution of a predicated vector memory access instruction may be interrupted by an exception, and an efficient mechanism would be useful for tracing execution of a memory access instruction in such situations. In one embodiment, this can readily be achieved through use of the predicate trace elements of the described embodiments. In particular, the trace generation circuitry may be arranged to issue within the data trace stream at least one predicate trace element to identify those lanes subjected to the memory transfer operation prior to the exception taking place, and subsequent to the predicated vector memory access instruction being resumed the trace generation circuitry may be arranged to issue within the data trace stream at least one predicate trace element to identify the remaining lanes subjected to the memory transfer operation. In one embodiment, these multiple predicate trace elements can then be logically combined to identify which lanes have been subjected to the memory transfer operation.

In a further embodiment, an apparatus may be provided for performing trace analysing functions. In particular, such an apparatus may comprise an input interface to receive trace information indicative of operations performed by processing circuitry when executing a sequence of instructions, where the sequence of instructions includes at least one predicated vector memory access instruction. The trace information may comprise a data trace stream comprising a plurality of trace elements, for each predicated vector memory access instruction executed, the data trace stream comprising a number of address trace elements. Each address trace element provides an address indication for an address accessed in memory, and each address trace element is associated with a fixed size data block irrespective of the size of the data values accessed when executing that predicated vector memory access instruction. The data trace stream also includes, for each predicated vector memory access instruction executed, at least one predicate trace element to identify any lanes of the vector that have been omitted from the memory transfer operation. The apparatus further comprises decompression circuitry to detect from the trace information, with reference to a program image, execution of a predicated vector memory access instruction within the sequence of instructions, and to reference the corresponding at least one predicate trace element within the data trace stream to determine which lanes were subjected to the memory transfer operation performed on executing that predicated vector memory access instruction. This then facilitates further analysis of the one or more address trace elements issued for the predicated vector memory access instruction, and indeed any corresponding data block trace elements.

In one embodiment, when the decompression circuitry detects from the program image execution of a potentially predicated vector memory access instruction, the predication status of that vector memory access instruction is then indicated by the presence of at least one associated predicate trace element within the data trace stream.

In one embodiment, the decompression circuitry may be arranged, when multiple predicate trace elements are issued within the data trace stream for one predicated vector memory access instruction, to apply a logical combination operation to those multiple predicate trace elements in order to identify any lanes of the vector that have been omitted from the memory transfer operation. As mentioned earlier, the logical combination operation may in one embodiment involve a simple logical OR operation.

Particular embodiments will now be described with reference to the Figures.

FIG. 1 is a diagram schematically illustrating a memory transfer operation that may be performed upon executing a predicated vector memory access instruction. The vector memory access instruction may be a vector load instruction arranged to load from addresses in the memory address space 8 a plurality of data values for storing within a vector register 2, or may be a vector store instruction used to store data values from the vector register 2 to specified addresses within the memory address space 8. Such vector memory access instructions may specify a contiguous sequence of addresses, as for the example illustrated in FIG. 1, or alternatively may specify a discontiguous sequence of addresses (for example by specifying a vector of address offsets to be applied to a specified base address).

The memory transfer operation 6 can be viewed as operating within a number of lanes, where the number of lanes is dependent on the size of the data values, and hence the number of data values within the vector. In the example shown in FIG. 1, it is assumed that there are four data values within the vector, and accordingly there are four lanes. When a vector memory access instruction is predicated, a predicate 4 is referred to identifying which lanes are active for the memory transfer operation. There are a number of ways in which the predicate can be specified, but in this example a value is provided for each of the lanes, a logic one value indicating that the associated lane is active, and a logic zero value indicating that the associated lane is inactive. Hence, for the particular example of predicate 4 shown in FIG. 1, lanes 0, 2 and 3 are active but lane 1 is inactive. Accordingly, when the memory transfer operation is performed, the data value in lane 1 is not transferred between memory and the vector register, but the data values within the other lanes are transferred.

As mentioned earlier, it is desirable to provide an efficient mechanism for tracing execution of such predicated vector memory access instructions. When tracing a memory access instruction, it is known to include within a data trace stream an address trace element to identify an address in memory accessed, and optionally to also include a data block trace element to identify a block of data accessed at that address. For a vector memory access instruction, this principle can be extended so as to trace the various addresses accessed, and optionally the data values accessed. It is desirable to do this in an efficient manner, so as to minimize the trace bandwidth used to trace such information. However, when the possibility of predication is supported, it will be appreciated that individual lanes may be omitted from the memory transfer operation, and it is desirable to be able to capture this additional level of information within the trace stream if a trace analysis circuit is to be able to build up a complete picture of exactly which addresses (and data values) were accessed when the memory transfer operation was performed on executing the predicated vector memory access instruction. The embodiments described hereafter provide an efficient mechanism for tracing execution of such predicated vector memory access instructions.

Figure 2:
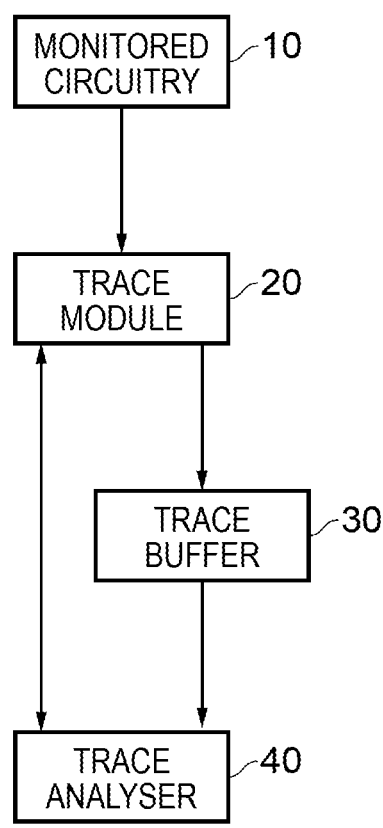
FIG. 2 is a block diagram of a system in accordance with one embodiment.

FIG. 2 schematically illustrates a system in accordance with one embodiment, providing monitored circuitry 10, a trace module 20, a trace buffer 30 and a trace analyser 40. Whilst FIG. 2 illustrates a system providing a trace buffer 30, in alternative embodiments the trace module 20 may pass its output directly to the trace analyser 40, without going via a trace buffer. The trace module is arranged to produce one or more trace streams comprising a series of trace elements, which then enables the trace analyser to reconstruct the activities of the monitored circuitry 10. The monitored circuitry 10 can take a variety of forms, but in one embodiment it includes at least one processing element, for example a processor core, that is arranged to execute a sequence of instructions. The monitored circuitry outputs execution information to the trace module 20 indicative of operations performed by the monitored circuitry when executing the sequence of instructions.

The trace module, which in one embodiment is embodied on-chip and may for example take the form of an ETM circuit produced by ARM Limited, Cambridge, United Kingdom, is arranged to produce one or more trace streams providing a series of trace elements. For example, an instruction trace stream may be produced, where the trace elements are indicative of execution of predetermined instructions within the instruction sequence. In one embodiment, rather than producing a trace element representative of each instruction that is executed by the monitored circuitry, the trace elements within the instruction trace stream only indicate the execution of certain predetermined instructions, with a trace analyser being provided with sufficient knowledge (e.g. via a program image) to enable it to reconstruct information about the instructions that have been executed between each such predetermined instruction for which a trace element is provided.

For example, in one embodiment where only an instruction trace stream is produced, the trace module may be arranged to generate a trace element in the instruction trace stream for every instruction flow changing instruction (typically a branch instruction) that is executed within the sequence, that trace element providing information about whether the branch was taken or not taken, and the trace analyser 40 is provided with a program image to enable it to determine, based on the information about the processing of the branch instructions, the actual sequence of instructions that has been executed. This enables a significantly reduced volume of trace elements to be produced. This is very useful, as the trace analyser 40 is typically provided off-chip, and hence the trace stream needs to be routed via pins of the chip to the analyser.

In some scenarios, it is also desirable to trace memory accesses performed by the monitored circuitry when executing the instructions, and accordingly in that instance the instruction trace stream may include a trace element for every memory access instruction executed. In addition, a data trace stream may be produced in addition to the instruction trace stream, so that for each such memory access instruction, one or more trace elements are issued within the data trace stream. In particular, the data trace stream may include, for each executed memory access instruction, one or more address trace elements, each address trace element providing an address indication for an address accessed in memory when executing that vector memory access instruction. If desired, data value tracing can also be incorporated within the data trace stream, such that in association with each address trace element, a data block trace element is also output identifying a block of data accessed at that address. This approach can be applied for both scalar memory access instructions and vector memory access instructions, but for vector memory access instructions it is often the case that more than one address trace element (and associated data block elements) need to be issued in association with the vector memory access instruction, in order to track all of the addresses (and optionally data values) accessed.

Often, a system will support processing being performed on various different sizes of data values. For example, word-size data values (i.e. 32 bits) may be operated on by some instructions, whilst half-word size data values (16 bits) are operated on by other instructions, and indeed in some instances byte size data values (8 bits) may be operated on by other instructions. Hence, when considering vector memory access instructions, the number of data values subjected to the memory transfer operation defined by the memory access instruction can vary significantly, dependent on the size of the data values. For example, considering a vector width of 128 bits, and using the above examples of data value sizes, it will be appreciated that a vector register may contain four 32-bit data values, eight 16-bit data values or sixteen 8-bit data values.

When the option of predicating execution of the instruction is then also accounted for, it will be appreciated that the number of lanes of processing will vary significantly dependent on the data value size, and when tracing such predicated vector memory access instructions it is desirable to identify which lanes, if any, have not been subjected to the memory transfer operation.

Whilst in principle it might be considered appropriate to try and capture such predicate information within individual address trace elements, this would require the trace element format to be modified to take account of the different data value sizes, leading to a proliferation in the number of different types of trace elements. It may also require both predicated and non-predicated versions of the address trace elements to be produced, so as to avoid overhead in the non-predicated case.

However, in accordance with the embodiments described hereafter, an improved mechanism is provided that makes more efficient use of the available trace bandwidth. In particular, as will be discussed, each address trace element provides an address indication for a fixed size data block irrespective of the size of the data values accessed when executing the predicated vector memory access instruction. In addition, the trace generation circuitry is then arranged to issue within the data trace stream, for each predicated vector memory access instruction executed, at least one predicate trace element that is used to identify any lanes of the vector that have been omitted from the memory transfer operation. This enables an efficient form of address trace element to be maintained and used irrespective of whether the vector memory access instruction is predicated or not. The predicate information can then be captured separately, and in some embodiments it has been found that only a single predicate trace element needs to be issued in association with a predicated vector memory access instruction. This has been found to provide a particularly efficient usage of the available trace bandwidth.

For example, considering the particular example of FIG. 1, and assuming the vector register is 128 bits wide, and hence each of the data values shown is 32 bits in length, the trace generation circuitry may be arranged to generate a trace element for each 32-bits of data accessed, and hence to issue an address trace element for each of the four addresses within the memory address space 8 illustrated in FIG. 1. For a contiguous load or store operation, the same number of address trace elements can be issued even when the data value size is 16 bits or 8 bits. In particular, for the 16-bit example, each address trace element will relate to a 32-bit block of data, and if data value trace is also enabled, the corresponding data block will also capture two of the 16-bit data values. Similarly, for 8-bit data values, each address trace element will identify an address used to access a 32-bit block of data, where that block of data includes four of the data values.

For non-contiguous variants (often referred to as gather instructions when loading data values from discontiguous addresses in memory into the vector register, or scatter instructions when storing to discontiguous addresses in memory the contents of the vector register), it may be necessary for more address trace elements to be issued, but again each address trace element will be assumed to relate to a 32-bit block of data, irrespective of the size of the data values being processed. The trace analysis circuitry can then identify the particular addresses (and optionally data values) accessed once it has determined the specific vector memory access instruction executed, and hence is aware of the data value size.

When capturing the predicate information in a separate predicate trace element, the above form of address trace element can still be used even if the memory access instruction is predicated. The predicate information is then captured separately and can be referred to by the trace analysis circuitry when it determines that the particular memory access instruction executed was a predicated version of the instruction. The predicate trace element can take a variety of forms, but provides sufficient information to identify any individual lanes that have not been subjected to the memory transfer operation.

Figure 3:
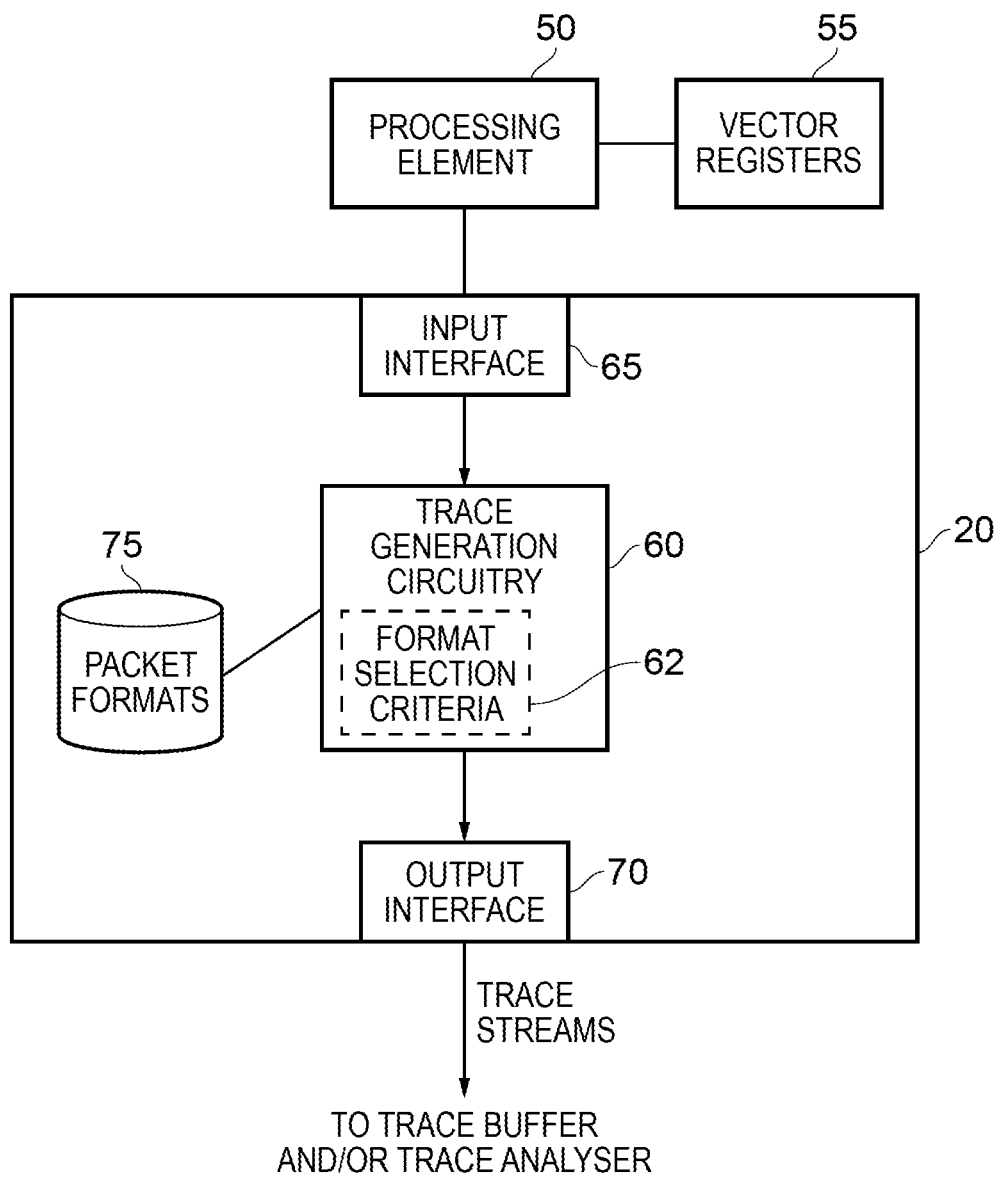
FIG. 3 is a block diagram illustrating in more detail a trace module used in accordance with one embodiment.

FIG. 3 is a block diagram illustrating the trace module 20 of one embodiment. As shown, the trace module 20 is coupled to a processing element 50, which in one embodiment forms at least part of the monitored circuitry. The processing element has access to a set of vectors registers 55, which are used when executing the earlier-mentioned vector memory access instructions.

As the processing element 50 executes a sequence of instructions, it passes execution information to the input interface 65 of the trace module 20, which is then forwarded to the trace generation circuitry 60. In one embodiment, this execution information will include information identifying when a predicated memory vector memory access instruction has been executed in order to transfer data values of a vector between one of the vector registers 55 and addresses accessed in memory. Assuming data tracing has been enabled, then the trace generation circuitry 60 will be arranged to issue a trace element (referred to herein as a P0 trace element) within the instruction trace stream to identify execution of the predicated vector memory access instruction. In addition, within a data trace stream, the trace generation circuitry will issue one or more address trace elements to identify the addresses accessed when processing the memory access instruction, and further will issue at least one predicate trace element to provide information identifying any lanes of the vector that have been omitted from the memory transfer operation. In one embodiment, each such predicate trace element is issued as a predicate trace packet, and storage 75 is provided that is accessible to the trace generation circuitry, that storage identifying multiple different formats for the predicate trace packet. The trace generation circuitry will then apply format selection criteria 62 to identify, for each instance of a predicate trace packet, which format of predicate trace packet to use.

Various example formats of the predicate trace packets are shown in FIGS. 5A to 5D. Considering format one shown in FIG. 5A, the predicate trace packet 150 includes a header field 152 which in one embodiment comprises a byte of information used to identify that this packet is a predicate trace packet. The number of bits required to form the header portion will vary dependent on the number of different packets supported within the data trace stream, but in one embodiment it has been found that a byte of information is sufficient to enable all of the various types of packets to be identified.

In one embodiment a mechanism is provided to link trace elements in the data trace stream with the corresponding P0 trace element included within the instruction trace stream. In particular, in one embodiment this linkage is performed through the use of a "left hand" or "right hand" key, which is a unique index reference to the relevant packet in either the instruction or the data trace streams. In particular, in one embodiment, in association with the P0 trace element included within the instruction trace stream for the predicated vector memory access instruction, a right hand key will be identified. Within the data trace stream, a corresponding left hand key can then be associated with one or more of the trace elements issued within the data trace stream in association with that predicated vector memory access instruction. In the format one variant shown in FIG. 5A, a field 154 can be specified within the packet 150 for identifying the left hand key.

The number of bytes required to specify the left hand key can vary dependent on embodiment, and in some embodiments multiple bytes may be required. Accordingly, provision of the left hand key information can consume significant bandwidth. However, in some embodiments, it is possible for the trace analysis circuitry to deduce the left hand key information for one or more packets based on previously transmitted information, and accordingly it may not be necessary to transmit the left hand key information with every packet. Accordingly, as shown in FIG. 5B, a format two variant of packet 160 may be provided that is the same as format one, with the exception that the left hand key information is omitted.

Figure 5A:
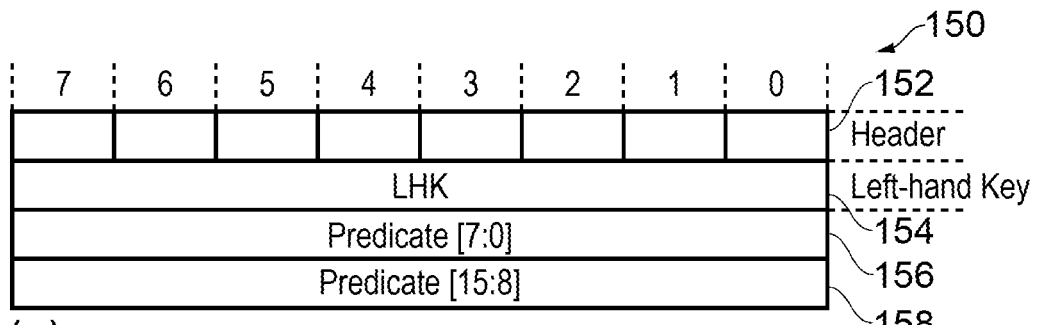
FIGS. 5A to 5D illustrate various predicate packet formats used in one embodiment.

In the format one packet of FIG. 5A, two fields 156, 158 are provided for providing 16 bits of predicate information. For the earlier example of 128-bit vectors, with data value sizes of 32-bits, 16-bits or 8-bits, this enables predicate information to be specified individually for each byte of information within the vector, and hence can accommodate the finest granularity of data value size for the above example embodiment. When considering the FIG. 5B variant, fields 166, 168 correspond to fields 156, 158 of FIG. 5A.

Figure 5B:
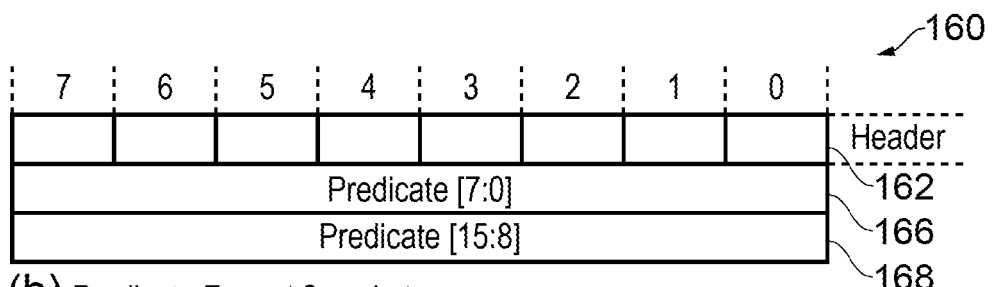
Figure 5C:
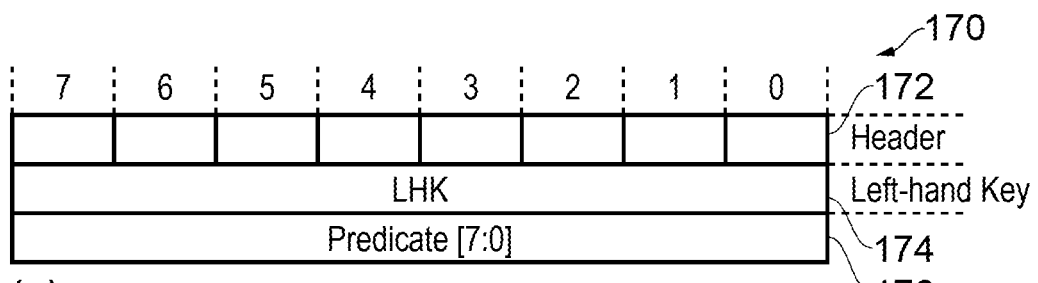
Figure 5D:
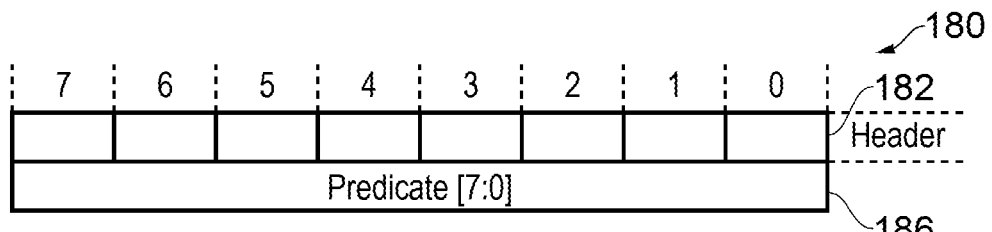

In the above example embodiment, when the data value size is 16-bits rather than 8-bits, it will be appreciated that only 8-bits of predicate information are required to identify the predication of the individual lanes, and FIGS. 5C and 5D hence illustrate alternative variants of the packets of FIGS. 5A and 5B that can be used in one embodiment in such situations. It should be noted that these variants are not required since the formats of FIGS. 5A and 5B can still be used, namely by duplicating the predicate information in each pair of bits so as to effectively identify predicate information for 8 lanes. Nevertheless, in embodiments that support the use of format 3 or format 4 shown in FIGS. 5C and 5D, this can reduce by one byte the size of each predicate trace packet issued in such situations, and accordingly can provide bandwidth efficiency benefits.

Hence, by comparing FIG. 5C with FIG. 5A it will be seen that the packet 170 of FIG. 5C includes a header portion 172 analogous to the header portion 152 of the packet 150 of FIG. 5A, and also includes a portion 174 analogous to the portion 154 of the packet of FIG. 5A in which the left hand key information can be specified. The field 176 then provides all of the predicate information, and replaces the two separate fields 156, 158 of FIG. 5A.

FIG. 5D shows a packet variant 180 which is analogous to the variant 170, but omits the left hand key information, and accordingly only includes a header portion 182 and predicate specifying portion 186.

For the embodiment where the data values are 32-bit values, and accordingly there are four data values within the vector, then in one embodiment any of the four example predicate formats can be used if desired, merely by replicating the predicate information for multiple bit positions. However, as will be discussed in more detail later, in one embodiment, in the particular scenario where four 32-bit data values are processed it may be possible to omit altogether the need to output a predicate trace packet, since the predicate information may be able to be inferred from the series of address trace packets issued.

Once the required trace elements have been determined by the trace generation circuitry 60, then those trace elements are output in the respective instruction or data trace streams via the output interface 70, for onward propagation to the trace buffer 30 and/or the trace analyser 40.

Figure 4:
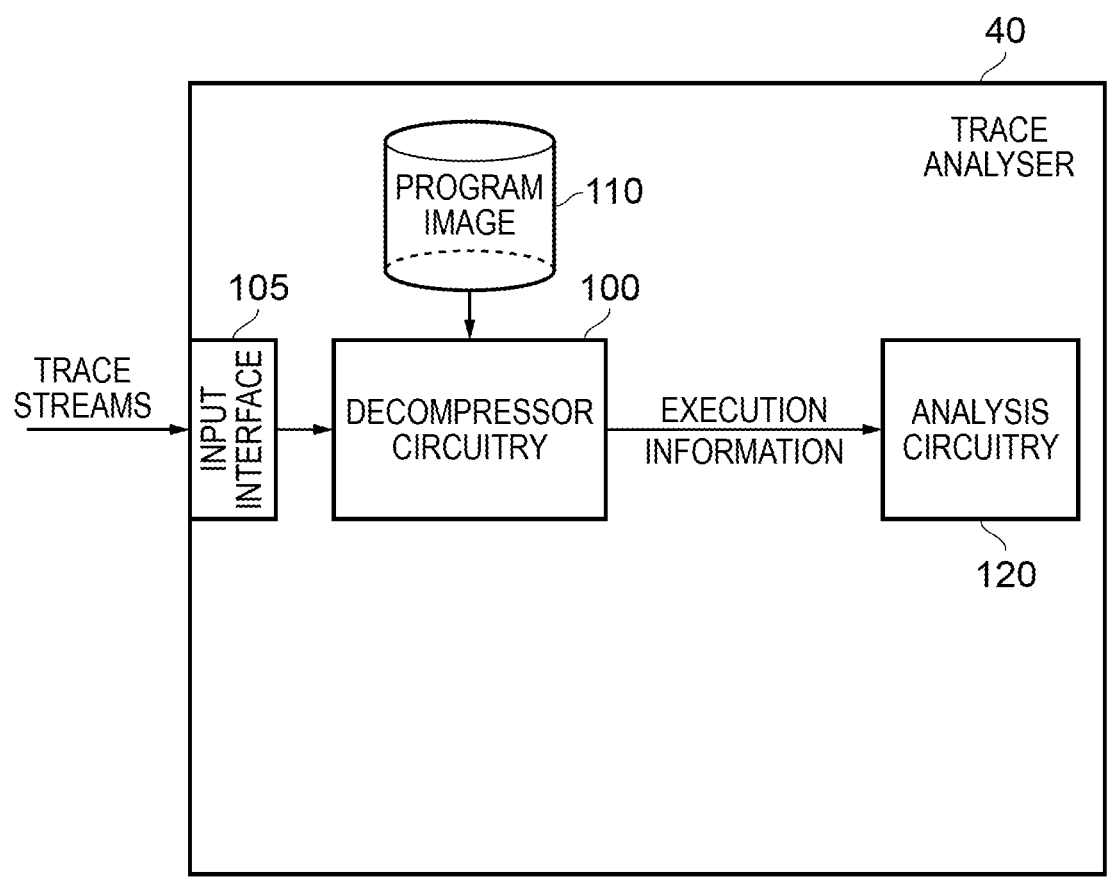
FIG. 4 is a block diagram illustrating in more detail trace analysis circuitry used in accordance with one embodiment.

FIG. 4 is a diagram schematically illustrating the trace analyser 40 of one embodiment. The trace analyser 40 receives the trace streams at its input interface 105, from where that information is then forwarded to the decompressor circuitry 100. The decompressor circuitry has access to a program image 110 providing a copy of the program code executed by the monitored circuitry. The decompressor circuitry 100 keeps track of a current address within the program image (the current address being set to a predetermined initial value at predetermined points, such as when trace is turned on, or through dedicated trace information), and each time a new trace element is received in the instruction trace stream, it traverses the program image until it reaches a next instruction within the program image that is of a predetermined type. For example, for instruction only tracing, it may be the case that only branch instructions are traced within the instruction stream, and accordingly each time a new trace element is received within the instruction stream, the program image is traversed until the next branch instruction is encountered. However, if data tracing is also enabled, then the instruction stream will capture not only branch instructions, but also each instance of an executed memory access instruction, and accordingly the program image is traversed until either a branch instruction or a memory access instruction is encountered.

The decompressor circuitry can then extract from the program image information about each of the instructions executed between the current address and the address of that next predetermined instruction, and can output all of that execution information to the analysis circuitry 120 for analysis. The current address can then be updated as appropriate. Hence, for a branch instruction, the current address may be updated based on the target address of the encountered branch.

When data tracing is enabled, and the decompressor circuitry 100 detects that a memory access instruction has been executed, it can then identify all of the relevant data trace elements within the data trace stream for that instruction. This will include one or more address trace elements, and if data value tracing is enabled it may also include a corresponding one or more data block trace elements. Further, if it is determined from the program image that the memory access instruction being executed is a predicated vector memory access instruction, then the data trace stream may include one or more predicate trace packets. Based on that information, the decompressor circuitry can then identify the various addresses (and optionally data values) accessed when executing the instruction, and can also provide that information to the analysis circuitry 120.

Figure 6:
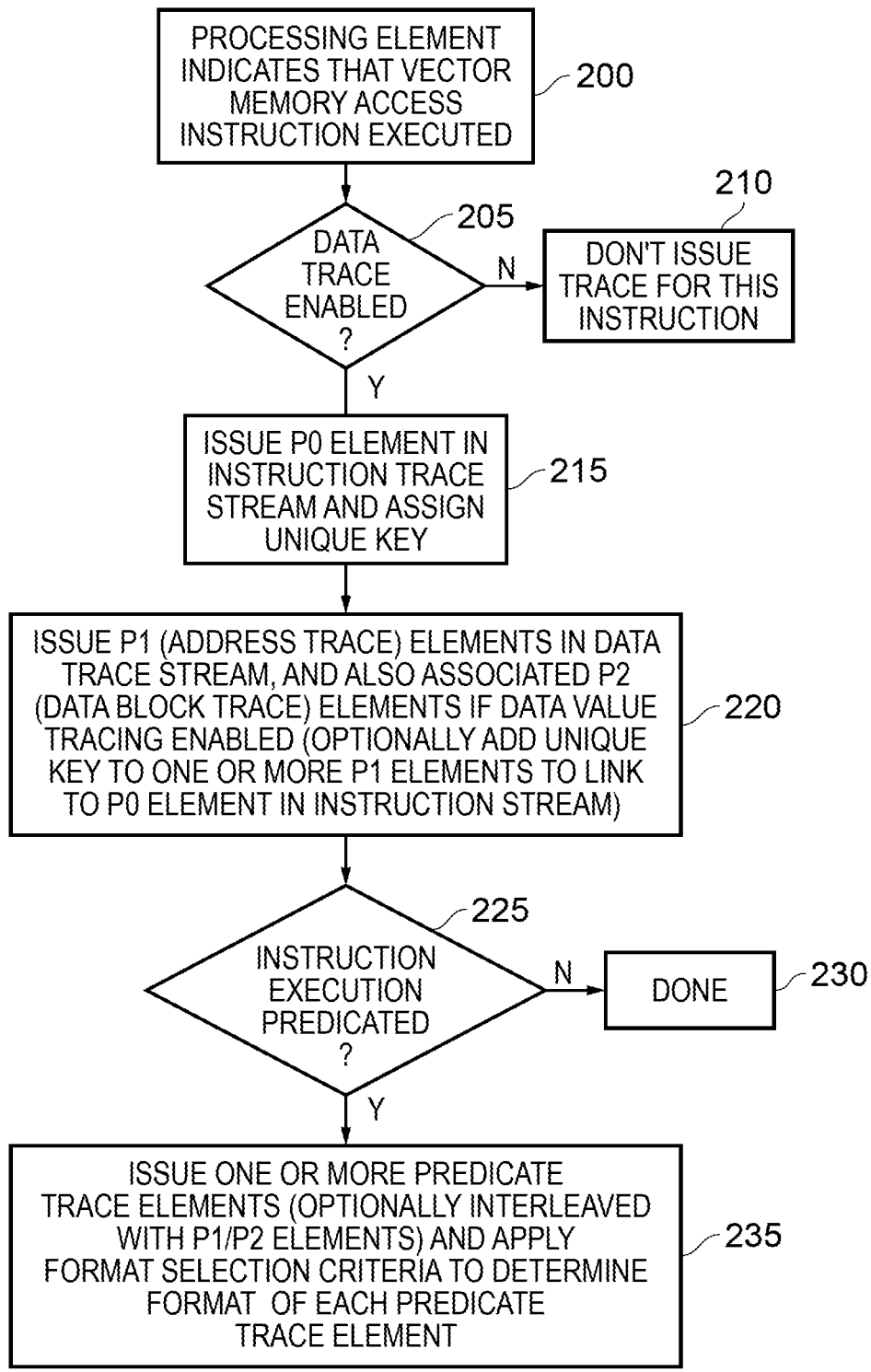
FIG. 6 is a flow diagram illustrating steps performed by the trace module in accordance with one embodiment.

FIG. 6 is a flow diagram illustrating the operation of the trace module 20 when the information it receives from the monitored circuitry indicates that a vector memory access instruction has been executed. As shown by box 200, when the processing element (monitored circuitry) indicates that a vector memory access instruction has been executed, then the trace generation circuitry 60 determines whether data trace has been enabled. If not, then processing proceeds to step 210, where no trace elements are issued for the current instruction. In particular, in one embodiment when data trace is not enabled, no data trace stream will be produced, and within the instruction trace stream there is no need to issue a trace element for the memory access instruction.

However, assuming data trace is enabled, then the process proceeds to step 215, where a P0 trace element is issued in the instruction trace stream to identify execution of the vector memory access instruction, and a unique right hand key is assigned to that instruction.

At step 220, one or more address trace elements (also referred to herein as P1 trace elements) are issued in the data trace stream, and if data value tracing is also enabled, then the associated data block trace elements (referred to herein as P2 trace elements) are also issued. Optionally, a left hand key can be assigned to one or more of the address trace elements to link those address trace elements to the corresponding P0 element in the instruction stream. In a similar way, if data value tracing is enabled, other unique right and left keys can be used to link each P1 address trace element with its corresponding data block trace element.

As mentioned earlier, in the described embodiments each P1 address element is issued for a fixed size data block irrespective of the size of the data values being processed by the memory access instruction. In one embodiment, when the memory access instruction processes a sequence of contiguous addresses, the number of address trace elements required will not vary dependent on the data value size, but when performing gather or scatter operations in respect of discontiguous addresses, the number of separate address trace elements will typically depend on the number of discontiguous addresses accessed, which itself may depend on the number of data values within the vector. However, it should be noted at this point that the format and number of address trace elements issued is generally independent of whether the vector memory access instruction is predicated or not (other than in a particular embodiment discussed later where individual address trace elements may be suppressed in their entirety if all data values to be associated with such an address trace element occupy lanes that are not subjected to the memory transfer operation). Instead, the predicate information is captured separately.

In particular, at step 225, it is determined whether the instruction execution is predicated, and if not, then as indicated by step 230 all of the required trace elements will have been issued for that instruction. However, if the instruction execution is predicated, then at step 235 one or more predicate trace elements will in one embodiment be issued within the data trace stream. The location of these predicate trace elements relative to the other trace elements within the data trace stream can vary dependent on embodiment, and optionally they may be interleaved with associated P1/P2 trace elements. However, in one embodiment, in the absence of any interruption of the processing of the predicated vector memory access instruction, a single predicate trace element is issued relating to the entirety of the predicated vector memory access instruction, and independent of the number of address trace elements issued. Further, in one embodiment, as discussed earlier with reference to FIG. 3, format selection criteria 62 is applied to determine the format of each predicate trace element issued. For example, if the data value size being processed is one byte, then one of the formats of FIG. 5A or FIG. 5B may be used to ensure that all of the required predicate information can be captured within a single predicate trace packet. Further, a decision will be made as to whether the left hand key information is required, or whether that can be inferred by the trace analyser from previously issued keys within the data trace stream, and this can be used to decide whether the FIG. 5A variant or the FIG. 5B variant is used. Similarly, if the data value size is a half word or a word, it may be decided to use one of the formats of FIG. 5C or FIG. 5D.

Figure 7:
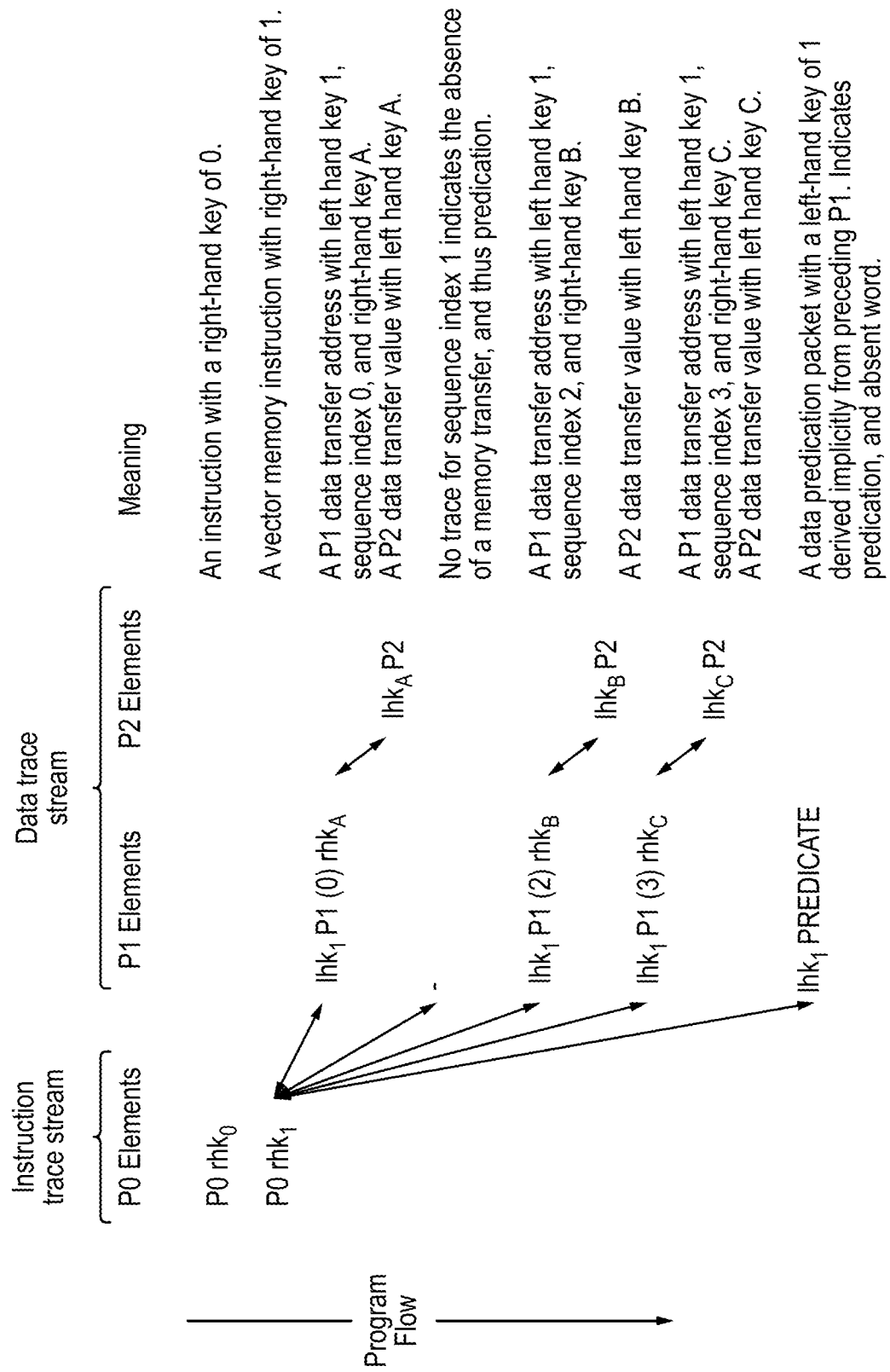
FIG. 7 schematically illustrates a sequence of trace elements issued within an instruction trace stream and a data trace stream to track execution behaviour of a predicated vector memory access instruction in accordance with one embodiment.

FIG. 7 is a diagram schematically illustrating the various trace elements issued within the instruction trace stream and the data trace stream for one example embodiment. In this example, it is assumed that an instruction with a right hand key of zero is issued within the instruction trace stream, in one embodiment that instruction not being a vector memory access instruction. A subsequent vector memory access instruction is then executed, resulting in a P0 trace element being issued within the instruction stream with a right hand key of one specified.

In this embodiment, a corresponding left hand key value of one is included in association with the P1 trace elements issued within the data trace stream, and indeed may also be used in association with a predicate trace element issued to identify the predicate information. However, as mentioned earlier, in some embodiments it may be possible for at least some of these trace elements to omit the inclusion of the left hand key value, with that left hand key value being inferred by the trace analyser from previously transmitted left hand key information. This may for example involve the trace decompressor incrementing previously sent keys in order to determine the appropriate key associated with particular trace elements. Alternatively, the left hand key value of one may be specified in association with the first address trace element, but each subsequent address trace element and the predicate trace element may not need the left hand key information to be specified again. For example, this may be possible if there are no intervening P1 trace elements or predicate trace elements relating to a different instruction in the data trace stream.

As shown in FIG. 7, in one embodiment each of the P1 address trace elements can have an associated sequence index specified. In this embodiment, it is assumed that four address trace elements are required to specify four addresses, each for a fixed size data block (for example a 32-bit data block). These individual trace elements can then have the sequence numbers 0, 1, 2 and 3 associated with them.

If data value tracing is also enabled, then corresponding P2 trace elements can be issued to identify the block of data accessed at the associated address. As shown in FIG. 7, unique right and left hand keys can be used to link the P1 and P2 elements within the data trace stream.

As shown in FIG. 7, a predicate trace element can be issued at a suitable point within the data trace stream, in this embodiment the predicate trace element being issued after the various P1 trace elements. This predicate trace element will also have the left hand key value 1 associated with it. This may be specified explicitly by using either the FIG. 5A or FIG. 5C variant of predicate trace packet, or may be derived implicitly from the left hand key values used by the P1 address elements, with the predicate trace element using either the FIG. 5B or FIG. 5D format.

As illustrated in FIG. 7, individual address trace elements can be selectively suppressed if the predicate information indicates that none of the data values associated with that address trace element occupy lanes that have been subjected to the memory transfer operation. In this example, it is assumed that no P1 trace element is required for the sequence index 1, since all of the data values associated with that address are predicated. This would, for example, be the case for the particular example illustrated in FIG. 1. It would also be the case if there were 8 16-bit data values, but the two lanes associated with address 1 were not subjected to the memory access operation, or indeed if the memory access operation was operating on 16 8-bit data values, and all four of the data values in the lanes associated with address 1 were not subjected to the memory access operation.

In the particular example of FIG. 1 where four 32-bit data values are processed, then there may be no need to issue the actual predicate data packet, and instead all of the predicate information may be identified from the absence of the address trace element for sequence index 1.

If one of the P1 address elements is suppressed for the above reasons, then the corresponding P2 data value element may also be suppressed if data value tracing is enabled.

If desired, more than one predicate trace packet may be issued within the data trace stream. For example, in one embodiment it would be possible to issue a predicate trace packet in association with each P1 address element. Each of those predicate packets could still use one of the formats shown in FIGS. 5A to 5D, but the corresponding predicate value for lanes not represented by that packet will be set to zero in one embodiment. The trace analyser can then obtain the complete predicate information by ORing the various predicate trace packets received.

Figure 8:
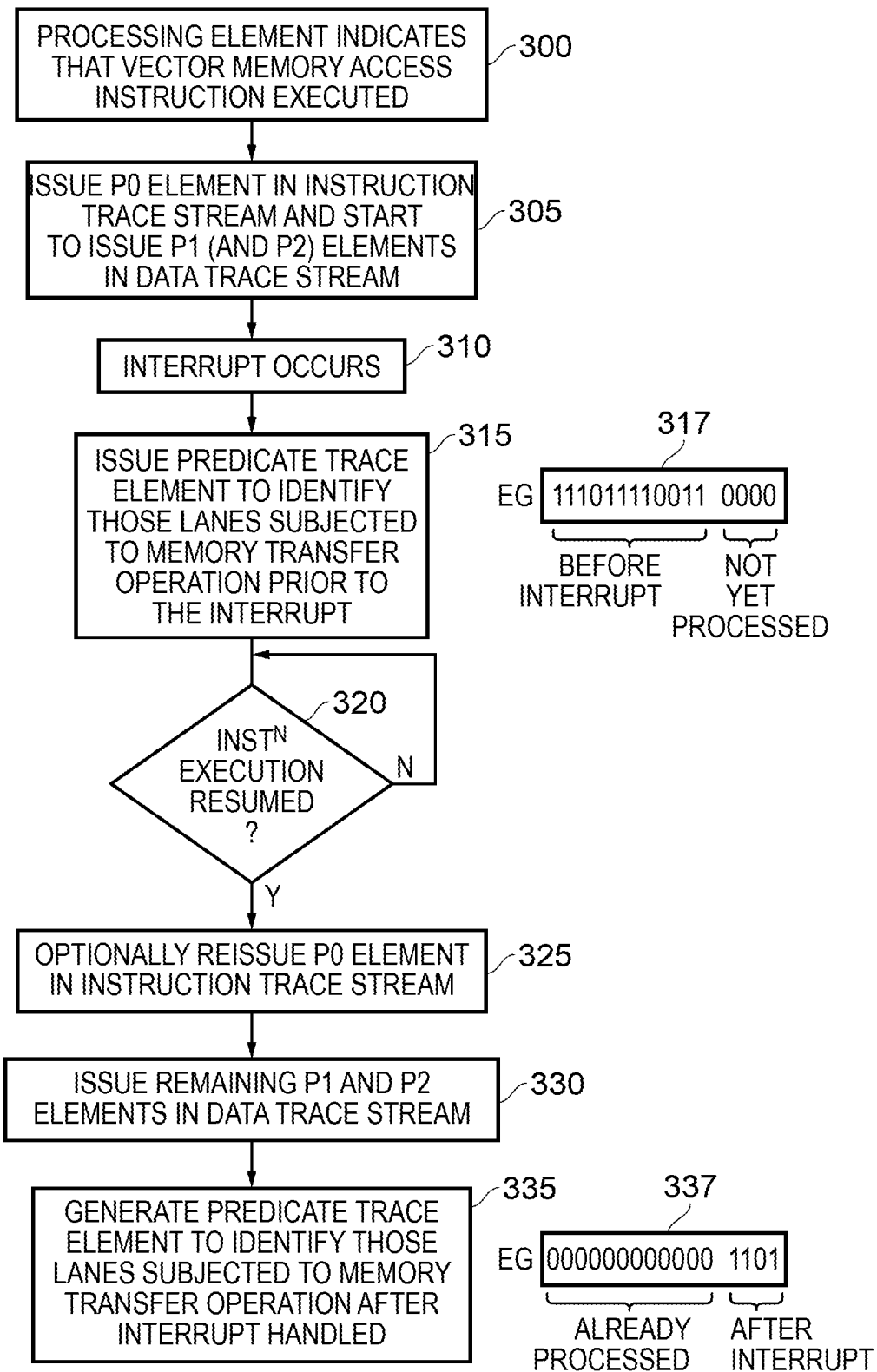
FIG. 8 schematically illustrates the operation of the trace module of one embodiment when an interrupt occurs part way through execution of a predicated vector memory access instruction.

However, in one embodiment a single predicate trace packet is issued as shown in FIG. 7. Nevertheless, in some instances it may still be necessary for more than one predicate trace packet to be issued, one example being shown in FIG. 8. In particular, in the example shown in the flow diagram of FIG. 8, it is assumed that an interrupt occurs partway through executing a vector memory access instruction. In particular, as shown in FIG. 8, once it is determined at step 300 that the processing element is executing a vector memory access instruction, then at step 305 a P0 element is issued in the instruction trace stream, and the trace generation circuitry 60 begins to issue P1 (and if desired P2) elements in the data trace stream to capture the various addresses (and data blocks) accessed.

However, as indicated by step 310, is assumed that an interrupt occurs before the instruction has completed execution. In the embodiment described in FIG. 8, this causes a predicate trace element to be issued at step 315 to identify the predicate information for those lanes that have been subjected to the memory transfer operation prior to the interrupt. In the particular example case illustrated by the box 317, it is assumed that the vector memory access instruction is performing a memory transfer operation on 16 8-bit data values, and the first 12 data values are processed prior to the interrupt. As can be seen by the box 317, the first 12 bits of the predicate data identify the predicate information for the individual lanes that have been processed, and the predicate data for the remaining four lanes is set to zero.

At step 320, the trace generation circuitry then awaits an indication that instruction execution has been resumed, and thereafter the process proceeds to step 325 where in one embodiment the trace generation circuitry reissues a P0 element in the instruction trace stream. However, as will be discussed later with reference to FIG. 9, in an alternative embodiment this may not be necessary.

Thereafter, at step 330, the trace generation circuitry issues the remaining P1 (and optionally P2) elements within the data trace stream, and then at step 335 generates a predicate trace element to identify the predicate information for the remaining lanes have been subjected to the transfer operation after the interrupt had been handled. Box 337 illustrates a particular example arrangement, where the last four lanes are processed after the interrupt, with the final four bits of predicate information providing an indication of the predication for those four lanes. All of the first twelve bits are set to logic zero values. It will be appreciated from a review of the example boxes 317, 337 that the trace analyzing circuitry can then simply determine the overall predicate information by performing a logical OR operation on the two sets of predicate values 317, 337.

Figure 9:
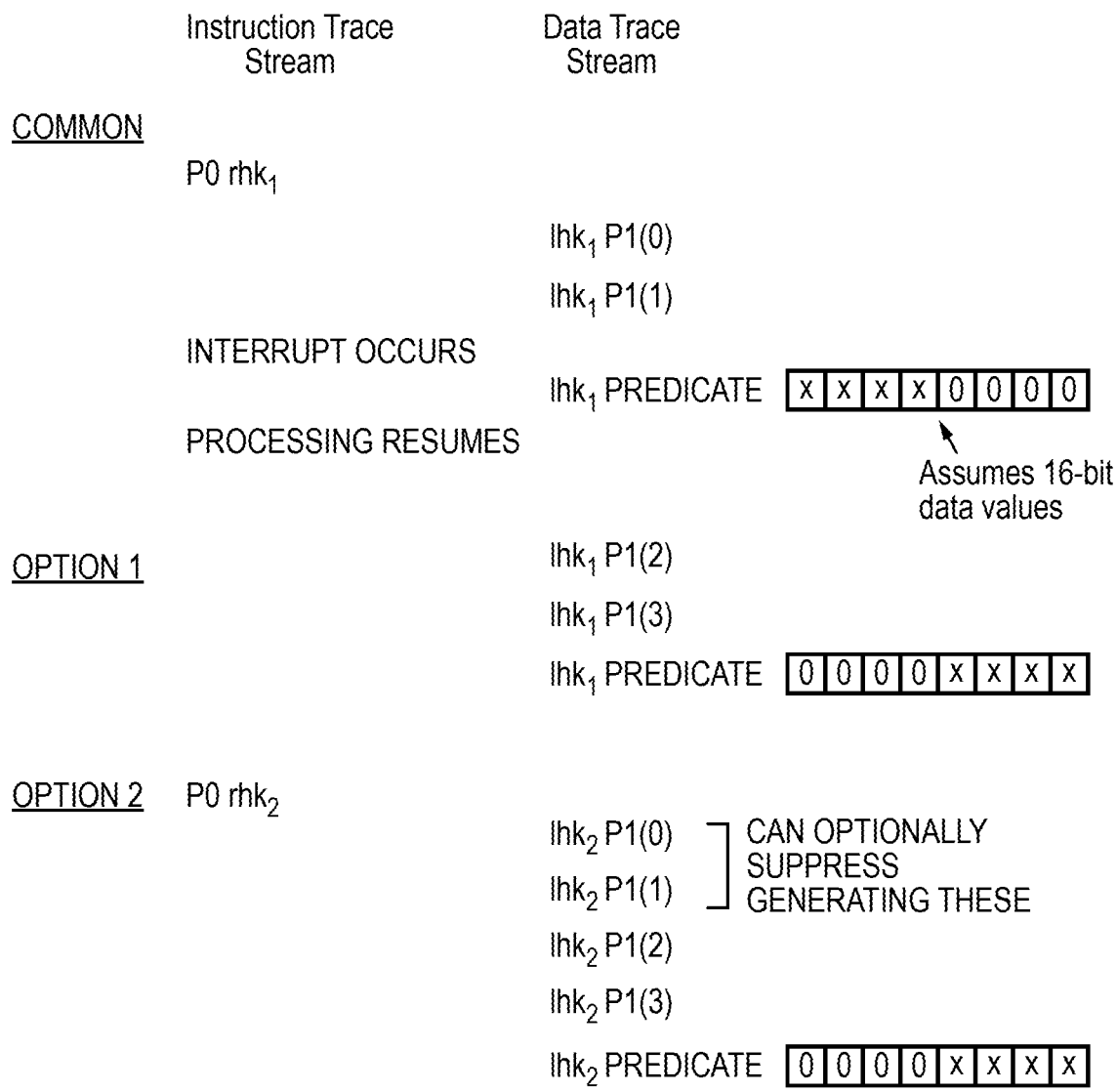
FIG. 9 schematically illustrates two different options for the sequence of trace elements within the instruction trace stream and the data trace stream that may be issued when execution of a predicated vector memory access instruction is temporarily interrupted and then resumes following that interruption.

FIG. 9 illustrates an example sequence of elements issued within the instruction trace stream and the data trace stream when performing the processing of FIG. 8. At step 305, a P0 element is issued in the instruction trace stream specifying a right hand key value of 1, and thereafter as each P1 address element is issued, in one embodiment they specify a left hand key value of 1, or that value can be inferred by the trace analyser from previously issued key information. Once the interrupt occurs, then a predicate trace element is issued at step 315, again either explicitly specifying the left hand key value of 1, or with that left hand key value being implicit. In this example, it is assumed that the first four of eight lanes were processed, prior to the interrupt taking place, and accordingly the final four bits of the predicate data will be set to zero, whilst the first four bits will have values identifying which of the first four lanes were subjected to the memory transfer operation.

Once processing resumes after the interrupt has been handled then FIG. 9 shows two possible options that may be pursued. In accordance with option one, step 325 of FIG. 8 is omitted, and the P0 trace element is not reissued. Instead, the data trace stream merely resumes by issuing the remaining P1 address elements with the sequence numbers being used to correlate those address trace elements with the preceding address trace elements. A final predicate trace element is then issued in which the first four lanes are set to zero, since the predicate behaviour of those lanes was covered by the earlier issued predicate, and the final four predicate bits identify which lanes were subjected to the memory transfer operation after the processing resumed.

In accordance with option two, then at step 325 the instruction trace element is reissued, this time with a different unique right hand key. All of the P1 address elements can then be reissued with an associated left hand key value, followed by a final predicate trace element taking the same form as the predicate trace element discussed with regards to option 1. In one embodiment, for the reasons discussed earlier when discussing FIG. 7, since the predicate information in the final predicate issued will identify that all of the lanes associated with the first two address trace elements were not processed, the first two P1 address trace elements can optionally be suppressed. The sequence numbering of the P1 address elements is then used to identify that the P1 address elements traced relate to the second and third addresses in the sequence.

Figure 10:
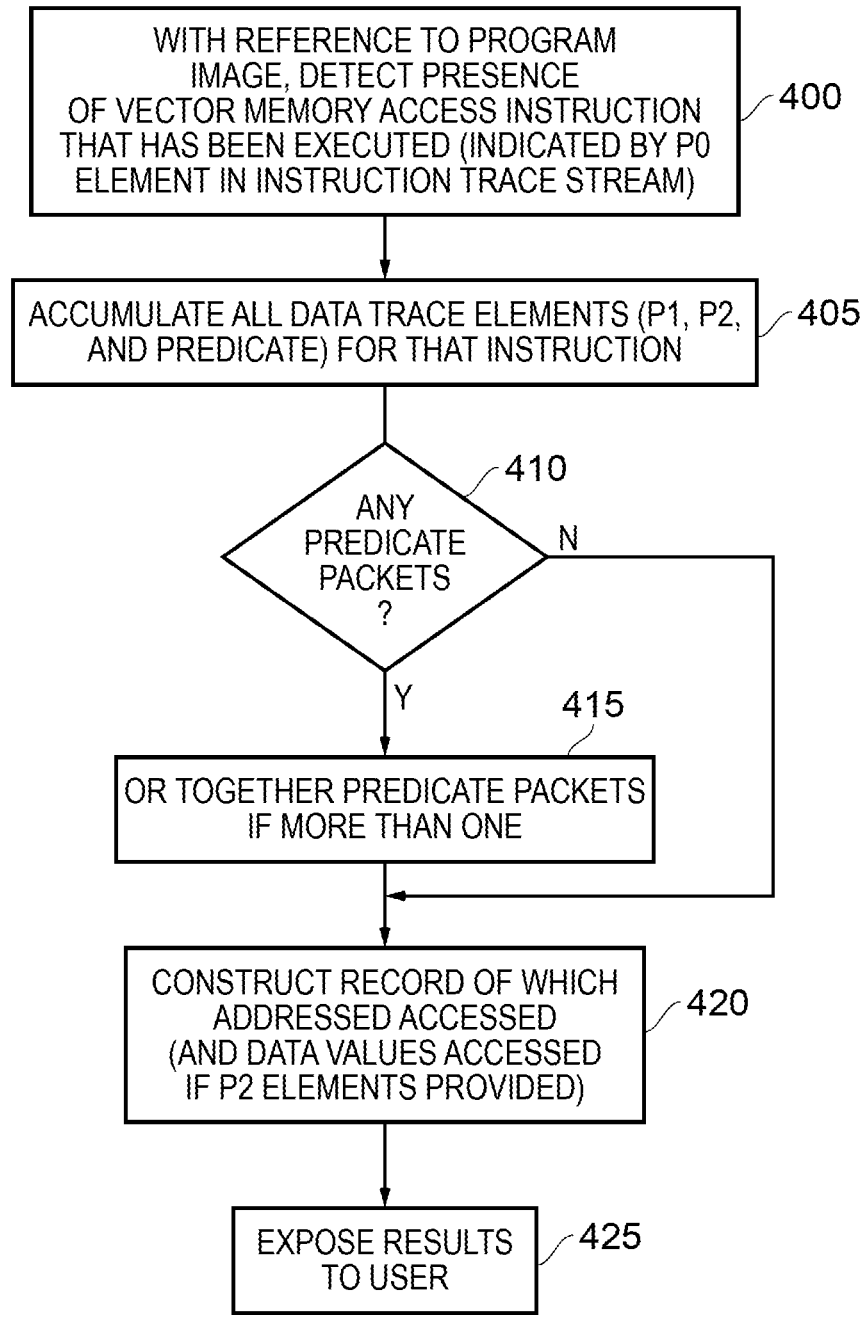
FIG. 10 is a flow diagram illustrating steps performed by the trace analysis circuitry in accordance with one embodiment.

FIG. 10 is a flow diagram illustrating the operation of the decompression circuitry 100 of FIG. 4 in accordance with one embodiment. At step 400, with reference to the program image 110, the decompressor circuitry 100 detects that a vector memory access instruction has been executed, this being indicated by a P0 element in the instruction trace stream, causing the decompressor circuitry to start traversing the program image from a current address, which then causes a vector memory access instruction to be identified.

In one embodiment, as shown at step 405, the decompressor circuitry can then accumulate all of the data trace elements within the data trace stream for that instruction (i.e. all the P1 and predicate trace elements, and optionally any P2 trace elements that are included). The decompressor circuitry can then determine at step 410 whether any predicate trace packets have been included, and if so it can OR together the predicate trace packets at step 415 if there is more than one. Thereafter, processing proceeds to step 420 where a record of which addresses have been accessed can be constructed using the P1 trace elements and the predicate information (if provided). If no predicate information is provided then it is assumed that all lanes associated with the provided P1 address elements are active, and the record of addresses accessed is reconstructed accordingly. Similarly, the data values accessed can be determined if P2 elements are provided. The results can then be exposed to a user at step 425, as a result of that information being forwarded to the analysis circuitry 120.

At step 420, the decompressor circuitry will have reference to the sequence numbers of the P1 elements. In one particular example, as mentioned earlier, if the data values being processed are 32-bit values, and hence within a 128-bit vector there are four lanes of processing, then there may be no need for a separate predicate trace packet to be issued, and instead individual address trace elements can be suppressed if the corresponding data value is not subjected to the memory transfer operation. By referring to the sequence numbers at step 420, the decompression circuitry can still determine which accesses were performed.

Whilst in FIG. 10, it is described that the analysis performed by the decompressor circuitry takes place once all of the data trace elements have been accumulated at step 405, in an alternative embodiment the process could be performed sequentially on a trace element-by-trace element basis as each trace element is extracted from the data trace stream, so as to form over time the record of the addresses and data accessed. For instance, considering FIG. 7, the decompressor circuitry could reconstruct the addresses and data values based on the three P1 address elements that are received, and then when the predicate trace packet is received, it can then quality the results produced by analyzing the P1 trace packets based on the predicate information, so as to exclude any addresses and associated data values that were not subjected to the memory access operation.

The above described embodiments that employ a combination of the use of address trace elements that are each associated with a fixed sized data block irrespective of the size of the data values accessed, and one or more associated predicate trace elements, provides a very efficient mechanism for tracing predicated vector memory access instructions.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
   an input interface to receive execution information from processing circuitry indicative of operations performed by the processing circuitry when executing a sequence of instructions, said sequence including at least one predicated vector memory access instruction executed to perform a memory transfer operation in order to transfer data values of a vector between a vector register and addresses accessed in memory, the vector comprising a plurality of lanes, wherein a number of the plurality of lanes is dependent on a size of the data values represented within the vector, and predicate information referenced when executing the predicated vector memory access instruction is used to determine which lanes are subjected to the memory transfer operation; and
   trace generation circuitry to generate from the execution information a data trace stream comprising a plurality of trace elements, for each predicated vector memory access instruction executed the trace generation circuitry being arranged to issue within said data trace stream a number of address trace elements, each address trace element providing an address indication for an address accessed in memory, and each address trace element being associated with a fixed sized data block irrespective of the size of the data values accessed when executing that predicated vector memory access instruction;
   the trace generation circuitry further being arranged to issue within the data trace stream, for each predicated vector memory access instruction executed, at least one predicate trace element to identify any lanes of the vector that have been omitted from the memory transfer operation.

2. An apparatus as claimed in claim 1, wherein for each predicated vector memory access instruction, the memory transfer operation is performed on data values whose size is selected from a plurality of supported data values sizes, and the fixed size data block is an integer multiple of each supported data value size.

3. An apparatus as claimed in claim 1, wherein each predicate trace element has a format such that, when multiple predicate trace elements are issued within the data trace stream for one predicated vector memory access instruction, application of a logical combination operation to those multiple predicate trace elements identifies any lanes of the vector that have been omitted from the memory transfer operation.

4. An apparatus as claimed in claim 3, wherein said logical combination operation is a logical OR operation.

5. An apparatus as claimed in claim 1, wherein:
   the trace generation circuitry is arranged to issue each predicate trace element as a predicate trace packet, the predicate trace packet comprising a header portion providing header information to distinguish the predicate trace packet from other types of trace packet, and a predicate specifying portion providing predicate data.

6. An apparatus as claimed in claim 5, wherein the trace generation circuitry has access to a plurality of formats for the predicate trace packet, and the trace generation circuitry is arranged to apply format selection criteria to determine a format of each predicate trace packet to be issued in the data trace stream.

7. An apparatus as claimed in claim 6, wherein the plurality of formats for the predicate trace packet comprises formats for different sizes of data values, and when applying the format selection criteria the trace generation circuitry is arranged to take into account the size of the data values transferred during execution of the predicated vector memory access instruction when determining which format of predicate trace packet to be issued.

8. An apparatus as claimed in claim 1, wherein:
   the trace generation circuitry is arranged to generate an instruction trace stream in addition to the data trace stream, and to include within the instruction trace stream an instruction trace element for each predicated vector memory access instruction executed by the processing circuitry, said instruction trace element specifying an identifier key; and
   the trace generation circuitry is arranged to selectively specify the identifier key for one or more of the trace elements issued in the data trace stream in order to link said one or more trace elements with the corresponding instruction trace element in the instruction trace stream.

9. An apparatus as claimed in claim 8, wherein:
   the trace generation circuitry has access to a plurality of formats for the predicate trace packet, and the trace generation circuitry is arranged to apply format selection criteria to determine a format of each predicate trace packet to be issued in the data trace stream; and
   wherein said plurality of formats for the predicate trace packet include formats that incorporate an identifier key portion.

10. An apparatus as claimed in claim 9, wherein the trace generation circuitry is arranged to select a format for the predicate trace packet that incorporates the identifier key portion when an inference of the identifier key pertaining to the predicate trace element is unobtainable from preceding trace elements within the data trace stream.

11. An apparatus as claimed in claim 1, wherein for each predicated vector memory access instruction executed the trace generation circuitry is arranged to issue within said data trace stream a plurality of address trace elements, each address trace element having a sequence number associated therewith.

12. An apparatus as claimed in claim 11, wherein when all data values to be associated with one of the address trace elements occupy lanes that are not subjected to the memory transfer operation, the trace generation circuitry is arranged to suppress issuance of that address trace element and its associated sequence number within the data trace stream.

13. An apparatus as claimed in claim 12, wherein an identification of the lanes of the vector that have been omitted from the memory transfer operation, as determined from the at least one predicate trace element, includes identification of at least those lanes associated with the address trace element that has been suppressed.

14. An apparatus as claimed in claim 12, wherein when all of the lanes of the vector omitted from the memory transfer operation are associated with an address trace element that has been suppressed, the trace generation circuitry is arranged to suppress generation of the at least one predicate trace element.

15. An apparatus as claimed in claim 1, wherein the trace generation circuitry is further arranged to issue within the data trace stream a data block trace element in association with each address trace element issued in the data trace stream, to identify the data block accessed at the address indicated by the associated address trace element.

16. An apparatus as claimed in claim 2, wherein the fixed size data block is 32 bits and the plurality of supported data value sizes are 8 bits, 16 bits and 32 bits.

17. An apparatus as claimed in claim 1, wherein if execution of the predicated vector memory access instruction is interrupted by an exception, the trace generation circuitry is arranged to issue within the data trace stream at least one predicate trace element to identify those lanes subjected to the memory transfer operation prior to the exception taking place, and subsequent to the predicated vector memory access instruction being resumed the trace generation circuitry is arranged to issue within the data trace stream at least one predicate trace element to identify the remaining lanes subjected to the memory transfer operation.

18. An apparatus comprising:
an input interface to receive trace information indicative of operations performed by processing circuitry when executing a sequence of instructions, said sequence including at least one predicated vector memory access instruction executed to perform a memory transfer operation in order to transfer data values of a vector between a vector register and addresses accessed in memory, the vector comprising a plurality of lanes, wherein a number of the plurality of lanes is dependent on a size of the data values represented within the vector, and predicate information referenced when executing the predicated vector memory access instruction is used to determine which lanes are subjected to the memory transfer operation;
the trace information comprising a data trace stream comprising a plurality of trace elements, for each predicated vector memory access instruction executed the data trace stream comprising a number of address trace elements, each address trace element providing an address indication for an address accessed in memory, and each address trace element being associated with a fixed sized data block irrespective of the size of the data values accessed when executing that predicated vector memory access instruction, the data trace stream also including, for each predicated vector memory access instruction executed, at least one predicate trace element to identify any lanes of the vector that have been omitted from the memory transfer operation;
the apparatus further comprising:
decompression circuitry to detect from the trace information, with reference to a program image, execution of a predicated vector memory access instruction within said sequence of instructions, and to reference the corresponding at least one predicate trace element within the data trace stream to determine which lanes were subjected to the memory transfer operation performed on executing that predicated vector memory access instruction.

19. An apparatus as claimed in claim 18, wherein the decompression circuitry is arranged, when multiple predicate trace elements are issued within the data trace stream for one predicated vector memory access instruction, to apply a logical combination operation to those multiple predicate trace elements in order to identify any lanes of the vector that have been omitted from the memory transfer operation.

20. An apparatus as claimed in claim 19, wherein said logical combination operation is a logical OR operation.

21. A method of operating trace generation circuitry to generate a trace stream comprising:
receiving execution information from processing circuitry indicative of operations performed by the processing circuitry when executing a sequence of instructions, said sequence including at least one predicated vector memory access instruction executed to perform a memory transfer operation in order to transfer data values of a vector between a vector register and addresses accessed in memory, the vector comprising a plurality of lanes, wherein a number of the plurality of lanes is dependent on a size of the data values represented within the vector, and predicate information referenced when executing the predicated vector memory access instruction is used to determine which lanes are subjected to the memory transfer operation;
generating from the execution information a data trace stream comprising a plurality of trace elements, including:
issuing within said data trace stream, for each predicated vector memory access instruction executed, a number of address trace elements, each address trace element providing an address indication for an address accessed in memory, and each address trace element being associated with a fixed sized data block irrespective of the size of the data values accessed when executing that predicated vector memory access instruction; and
issuing within the data trace stream, for each predicated vector memory access instruction executed, at least one predicate trace element to identify any lanes of the vector that have been omitted from the memory transfer operation.

22. A method of operating analysis circuitry to process a trace stream, comprising:
receiving trace information indicative of operations performed by processing circuitry when executing a sequence of instructions, said sequence including at least one predicated vector memory access instruction executed to perform a memory transfer operation in order to transfer data values of a vector between a vector register and addresses accessed in memory, the vector comprising a plurality of lanes, wherein a number of the plurality of lanes is dependent on a size of the data values represented within the vector, and predicate information referenced when executing the predicated vector memory access instruction is used to determine which lanes are subjected to the memory transfer operation; and detecting within the trace information a data trace stream comprising a plurality of trace elements, for each predicated vector memory access instruction executed the data trace stream comprising a number of address trace elements, each address trace element providing an address indication for an address accessed in memory, and each address trace element being associated with a fixed sized data block irrespective of the size of the data values accessed when executing that predicated vector memory access instruction, the data trace stream also including, for each predicated vector memory access instruction executed, at least one predicate trace element to identify any lanes of the vector that have been omitted from the memory transfer operation; and detecting from the trace information, with reference to a program image, execution of a predicated vector memory access instruction within said sequence of instructions, and referencing the corresponding at least one predicate trace element within the data trace stream to determine which lanes were subjected to the memory transfer operation performed on executing that predicated vector memory access instruction.

\* \* \* \* \*